United States Patent [19]

Hart et al.

[11] Patent Number: 4,479,832
[45] Date of Patent: Oct. 30, 1984

[54] METHOD OF PRODUCING LIGHT ABSORPTIVE SURFACE ON ALUMINUM ZINC ALLOY COATED PRODUCT

[75] Inventors: Robert G. Hart, Bethlehem; Herbert E. Townsend, Center Valley, both of Pa.

[73] Assignee: Bethlehem Steel Corporation, Bethlehem, Pa.

[21] Appl. No.: 377,511

[22] Filed: May 12, 1982

Related U.S. Application Data

[63] Continuation-in-part of Ser. No. 273,285, Jun. 15, 1981, abandoned.

[51] Int. Cl.$^3$ .............................................. C23F 5/02
[52] U.S. Cl. ........................... 148/6.14 R; 148/6.27; 148/31.5; 428/653; 428/659
[58] Field of Search ............... 428/629, 632, 633, 653, 428/659; 106/1.27; 148/6.14 R, 6.24, 6.27, 31.5; 126/901

[56] References Cited

U.S. PATENT DOCUMENTS

| | | | |
|---|---|---|---|
| 2,023,645 | 12/1935 | Newton et al. | 148/31.5 |
| 3,343,930 | 9/1967 | Borzillo et al. | 428/653 |
| 3,418,174 | 12/1968 | Carter et al. | 148/6.14 R |
| 3,717,510 | 2/1973 | Boose et al. | 148/6.27 |
| 3,920,413 | 11/1975 | Lowery | 126/901 |
| 4,055,707 | 10/1977 | McDonald | 428/679 |
| 4,150,191 | 4/1979 | Karki | 126/901 |
| 4,211,210 | 7/1980 | Muenker et al. | 428/633 |
| 4,262,060 | 4/1981 | Shikata et al. | 126/901 |
| 4,287,266 | 9/1981 | Mygs | 428/632 |

FOREIGN PATENT DOCUMENTS

| | | | |
|---|---|---|---|
| 52-5026 | 1/1977 | Japan | 126/901 |
| 54-150744 | 11/1979 | Japan | 126/901 |
| 1545890 | 5/1979 | United Kingdom | 148/6.27 |

OTHER PUBLICATIONS

Gogna, P. K., et al., "Selective Black Nickel Coatings on Zinc Surfaces by Chemical Conversion", *Solar Energy*, vol. 23, pp. 405–407 (1979).

Branciavoli, J. P., et al., "Black Chrome Plating: Application and Deposit Characteristics of a New Plating Process", *Plating*, pp. 37–43; (1969).

*Primary Examiner*—Michael L. Lewis
*Attorney, Agent, or Firm*—John J. Iverson; William B. Noll

[57] ABSTRACT

This invention is directed to a method for producing a corrosion-resistant, composite product, such as sheet and strip, having a thin, uniformly black, light-absorptive surface layer thereon, and to the product of such method. The method includes the steps of treating a product having a coating containing both zinc and aluminum, such as galvanized strip, or up to 70% by weight, aluminum, balance essentially zinc coated strip, with an aqueous alkaline solution for a sufficient time to form a zinc-rich surface on said product, which surface is reactive with a blackening bath containing Ni and Sb, and subjecting such treated product to such blackening bath to form said thin, uniform, light-absorptive surface layer on said product. The light-absorptive surface layer has a thickness of at least 80 nm, preferably between about 100–400 nm, and an absorptance greater than about 95% over the solar radiation spectrum.

6 Claims, 7 Drawing Figures

METHOD OF PRODUCING LIGHT ABSORPTIVE SURFACE ON ALUMINUM ZINC ALLOY COATED PRODUCT

RELATED APPLICATION

This application is a continuation-in-part of U.S. Ser. No. 273,285 filed June 15, 1981, now abandoned.

BACKGROUND OF THE INVENTION

This invention relates to a method, and to the product thereof, whereby a product having a zinc-aluminum containing surface layer, preferably sheet and strip, is treated to produce a thin, uniformly black, light-absorptive surface layer on said product. The method represents an economical system for producing corrosion resistant material for solar collectors. This efficient, yet economical method for producing such material is particularly important as a result of the rising concern over the serious depletion of and access to the world's energy producing natural resources. This, however, is not to suggest that such concern is only recent.

It has long been recognized that alternative energy sources were vitally necessary to the well being of mankind. However, the problem was not so much in finding such alternative sources, but in developing a safe, efficient cost-competitive system for using the alternative sources. The method of this invention, which results in an inexpensive, corrosion-resistant, light-absorbing sheet product suitable for use as the absorbing surface of solar collectors, is a major step in the right direction.

Solar collectors by their very nature are exposed to the atmosphere. As a consequence, an inexpensive base material resistant to atmospheric conditions, while affording galvanic protection to cut or exposed edges of solar collector components, is a necessity. Zinc-containing coated ferrous strips, such as galvanized and aluminum-zinc alloy coated strip, are ideal candidates for solar collector components as they offer both galvanic protection and resistance to atmospheric conditions to the ferrous base. However, in order to effectively use such coated products for construction of a light-absorbing component of a solar collector, a means is required to confer light-absorbing properties to the component's surface. Heretofore, heavy reliance has been placed on expensive treatments or paints, often with high application costs, such as black chrome electroplate and black pigmented paints for this purpose.

However, there are other known procedures and compositions which are available for blackening metals. None were found, for instance, which employ processing steps herein described for the rapid and continuous blackening of aluminum-zinc alloy coated products. U.S. Pat. No. 3,391,012 (Mitchell et al) teaches an electroless process for blackening of aluminum. U.S. Pat. No. 3,899,367 (Mitchell) teaches compositions and methods adapted for blackening hardened steels. U.S. Pat. No. 3,314,812 (Mitchell) teaches a method of blackening stainless steels. Finally, U.S. Pat. Nos. 3,127,279 (Baig et al) and 2,679,475 (Singler) teach processes for blackening a variety of metals including zinc, zinc alloys and galvanized zinc. Singler discloses no special surface preparation and indicates that the blackening treatments require minutes rather than seconds. Such a process is hardly suitable for a continuous operation. Baig et al, on the other hand, teaches various surface treatments, all of which are acid. Even with such acid treatment of the surface, the subsequent immersion time in the blackening solution is at least 30 seconds up to several minutes. In contrast to such prior art practices, the present invention represents a method of applying an inexpensive light-absorptive surface layer to an inexpensive corrosion resistant, aluminum-zinc alloy coated base, preferably a ferrous base, in a rapid and continuous manner, to provide a product suitable for solar collector components.

BRIEF SUMMARY OF THE INVENTION

This invention is directed to a composite product, preferably comprising a ferrous core, an intermediate layer of an aluminum and zinc, and a light-absorptive surface layer having a thickness of at least 80 nm, preferably between about 100-400 nm. The composition of said surface layer typically comprises, by atomic percent, 30 oxygen, 28 zinc, 17 nickel, 12 antimony, with minor amounts of carbon, sulfur and nitrogen. The method to produce such composite product is particularly suitable for continuous operation. Such method includes the steps of treating a product having a zinc-aluminum alloy coating thereon, preferably a ferrous coated product in which the aluminum content of the coating can be as low as about 0.10%, by weight, balance essentially zinc, which is the coating composition of galvanized steel, or as high as 70%, by weight, balance essentially zinc, which incorporates the coating composition of an aluminum-zinc alloy coated steel produced by Bethlehem Steel Corporation under the trademark GALVALUME, with an aqueous alkaline solution for a sufficient time to form on said product a zinc-rich surface layer, and subjecting such treated product in a blackening bath of an aqueous solution of Ni and Sb.

DETAILED DESCRIPTION OF PREFERRED EMBODIMENT

Referring now to the several FIGURES, it should be noted that while the preferred method of this invention is a continuous process, more particularly a continuous process for treating aluminum-zinc alloy coated ferrous strip, the method may also be practiced as a batch process on ferrous strip or other products coated with said aluminum-zinc alloy. The differences in processing parameters for the two treatment modes will be explained hereinafter.

Figure 1:
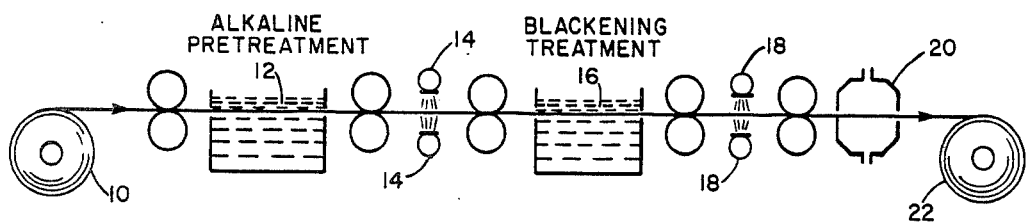
FIG. 1 is a schematic diagram of a preferred, continuous chemical blackening treatment for aluminum-zinc alloy coated sheet or strip according to this invention.

FIG. 1 is a schematic diagram of a continuous process for providing a light-absorptive surface on an aluminum-zinc alloy coated product. The aluminum-zinc alloy coated product, preferably a continuous strip, is fed from a pay-off reel 10 into an aqueous, alkaline solution 12 for a sufficient time to create a zinc-rich surface layer on said strip. While more information will follow hereinafter regarding the alkaline pretreatment of the aluminum-zinc alloy coated strip, a typical immersion time may vary from several seconds to nearly a minute depending on solution concentration and temperature, and strip surface condition. Hence, the method of this invention is ideally suited to a continuous process.

The alkaline pretreated strip may be rinsed by sprays 14, such as hot water sprays, and then immersed into a nickel-antimony blackening bath 16 which forms the thin, light-absorptive layer on the strip. A second rinse 18 may follow to remove residual blackening solution, followed by drying, such as by blowers 20 before being secured on takeup roll 22.

Figure 2:
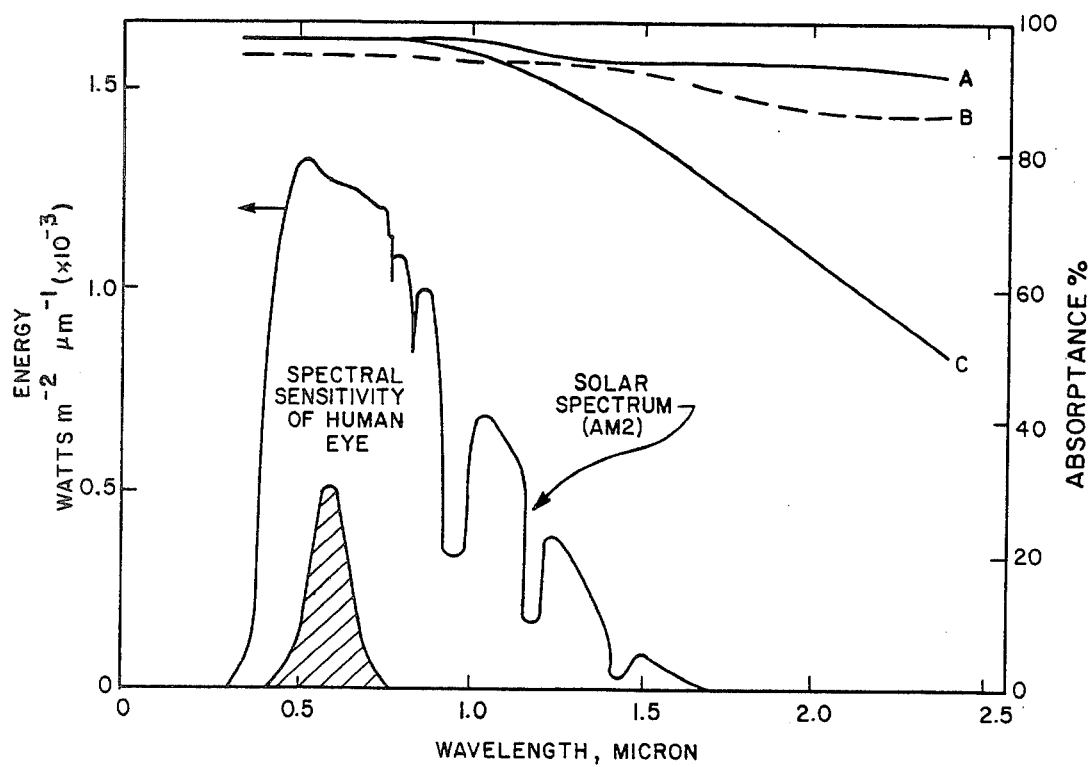
FIG. 2 is a graphic illustration of the total solar radiation spectrum reaching the Earth's surface and the portion thereof to which the human eye is sensitive; superimposed thereon are the spectral absorptances of a product according to this invention and two prior art products.

The most critical steps of this method are the alkaline pretreatment and the blackening treatment. However, before discussing such steps, it may be helpful, through the graphic illustration of FIG. 2, to show the spectral distribution of solar energy reaching the Earth's surface and the spectral sensitivity of the human eye, and how the information thereof relates to this invention. The data for FIG. 2 is based on the solar spectrum after transmission through two optical air masses (AM2).

A relatively inexpensive product, such as found in the product of this invention, which provides high absorptance over the wavelengths in the solar spectrum (0.35 to 2.4 microns) is quite significant since, for low-temperature-solar-absorber applications, it can be shown that high absorptance is the most important property contributing to collector thermal efficiency. For comparison, FIG. 2 also shows the spectral absorptance of three products: A—the product of this invention, B—aluminum-zinc alloy coated ferrous strip painted with a solar-selective black paint, and C—black chrome electroplate on Ni foil. As can be seen, the product of this invention has as high, or higher, absorptance over the solar spectrum as do products produced by conventional, but expensive, blackening processes.

Figure 3A:
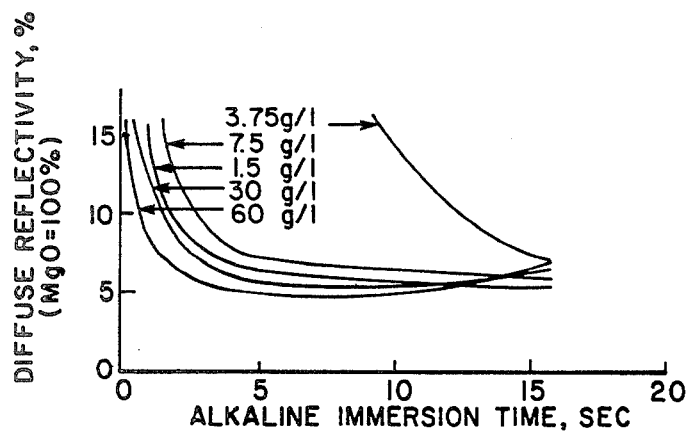
FIGS. 3a and 3b illustrate the effect of alkaline solution concentration and immersion time for a batch operation on achieving minimum diffuse reflectivity of aluminum-zinc alloy coated sheet or strip subjected to the method of this invention, where the sole variable is the alkaline pretreatment.
Figure 3B:
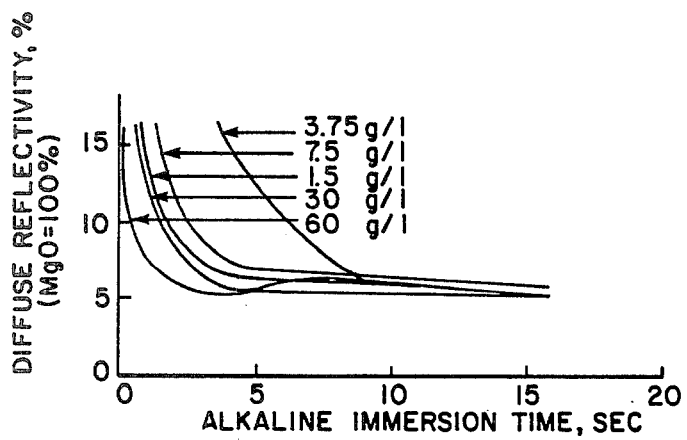

It was indicated previously that the alkaline pretreatment is one of the critical steps of this invention. FIGS. 3a and 3b demonstrate the effect of a bath alkaline pretreatment immersion time and concentration, at a temperature of 160° F. (71° C.) on the diffuse reflectivity of aluminum-zinc alloy coated steel treated according to this invention. There are several methods for determining the diffuse reflectivity of a product. A simplified laboratory procedure is to compare the reflectivity to that of magnesium oxide (MgO), a white substance with very high reflectance. Thus, MgO is a standard which may be used for visible light reflectance.

The necessity for such alkaline pretreatment is due to the presence of aluminum, aluminum oxide and zinc oxide on the surface of the aluminum-zinc alloy coatings. The aluminum content of the coating need not be significant as conventionally produced galvanized strip contains only about 0.10 to 0.15%, by weight, aluminum in the zinc alloy coating. During solidification of a conventional galvanized coating, typically containing about 0.10 to 0.15%, by weight, aluminum, the aluminum combines with oxygen and segregates at the surface as a thin film of $Al_2O_3$. That the recognitiion of such a small amount of aluminum in the coating was a significant factor to the discovery of this invention was shown in a laboratory investigation. Laboratory investigations showed that pure zinc strip, the surface of which was abrasively cleaned to remove oxides and other foreign matter, could be suitably blackened without prior treatment in an alkaline bath in accordance with this invention.

Thus, for purposes of this invention, aluminum-zinc alloy coated ferrous strip includes alloy coatings containing as little as about 0.10%, up to about 70%, by weight, aluminum, balance essentially zinc. Within such range of aluminum-zinc alloy coatings are conventional hot-dip galvanized strip and GALVALUME sheet. GALVALUME is a trademark of Bethlehem Steel Corporation for aluminum-zinc alloy coated steel sheet, where the coating typically comprises, by weight, 55% Al, 1.6% Si, balance Zn. GALVALUME sheet is a product covered by U.S. Pat. No. 3,343,930. The invention of such patent is directed to an aluminum-zinc alloy coating metallurgically bonded to a ferrous base, where said coating comprises, by weight, 25% to 70% Al, at least 0.5% Si based on the Al content, and the balance substantially Zn.

The purpose of the alkaline pretreatment is to dissolve the aluminum, and remove oxides and impurities, such as oils, from the strip surface, where the thus treated surface may then be characterized as a zinc-rich surface essentially free of aluminum and highly reactive to the nickel-antimony blackening bath. At solution concentrations of at least about 7.5 g/liter of water, preferably at least about 10 g/liter, immersion times of several seconds may be sufficient to practice this invention. However, whether following a batch or continuous process, a proper relationship must be established among the several parameters: (1) immersion time, (2) alkaline concentration and, (3) solution temperature, to satisfactorily treat the surface of the strip. For example, in a continuous operation, where the feed stock is a coil of aluminum-zinc alloy coated steel strip having a highly oiled surface, an increase in immersion time or concentration may be necessary to satisfactorily treat the strip surface.

While not desiring to be restricted to a given alkaline solution, the data to develop FIG. 3a was based on the use of $Na_2CO_3$, and FIG. 3b on the use of NaOH. A variety of commercial alkaline cleaning products are acceptable. One in particular, such as PENNSALT-86B, a trademark of Pennsalt Chemical Corp., gave good results.

A second critical step in the method of this invention is treatment of the alkaline pretreated product, such as by immersion, in a chemical blackening solution. A suitable aqueous solution (1 to 100 vol. % concentration) is one containing:

Nickel(ous) chloride—40.5 g/l
Antimony potassium tartrate—27.4 g/l
Sodium thiocyanate—22.9 g/l
Ammonium fluoride—1.4 g/l
Sulfuric acid—7.5 cc/l, or a blackening solution produced under the trademark RT-Z40, by Mitchell-Bradford Chemical Co.

Figure 4B:
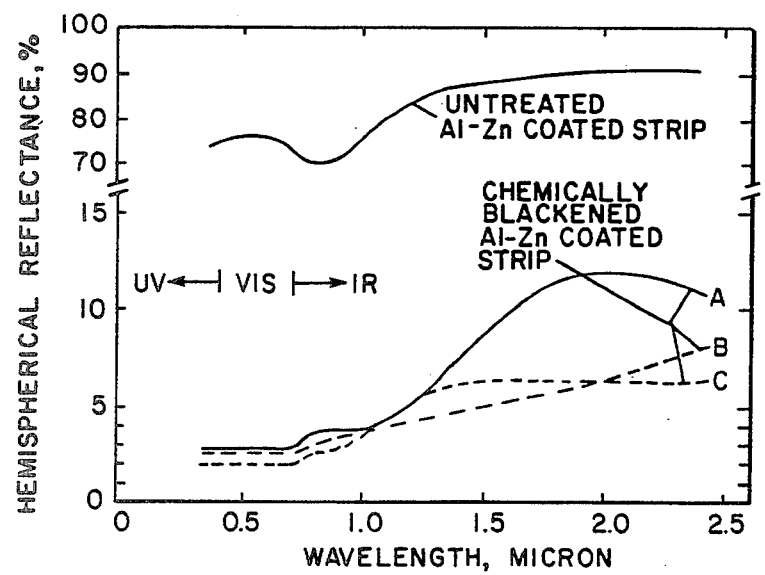
FIG. 4b shows a comparison of the hemispherical spectral reflectance of untreated and chemically blackened aluminum-zinc alloy coated sheet over the wavelengths in the solar spectrum, where the variations in the chemically blackened products are in time of immersion in the blackening solution
Figure 4A:
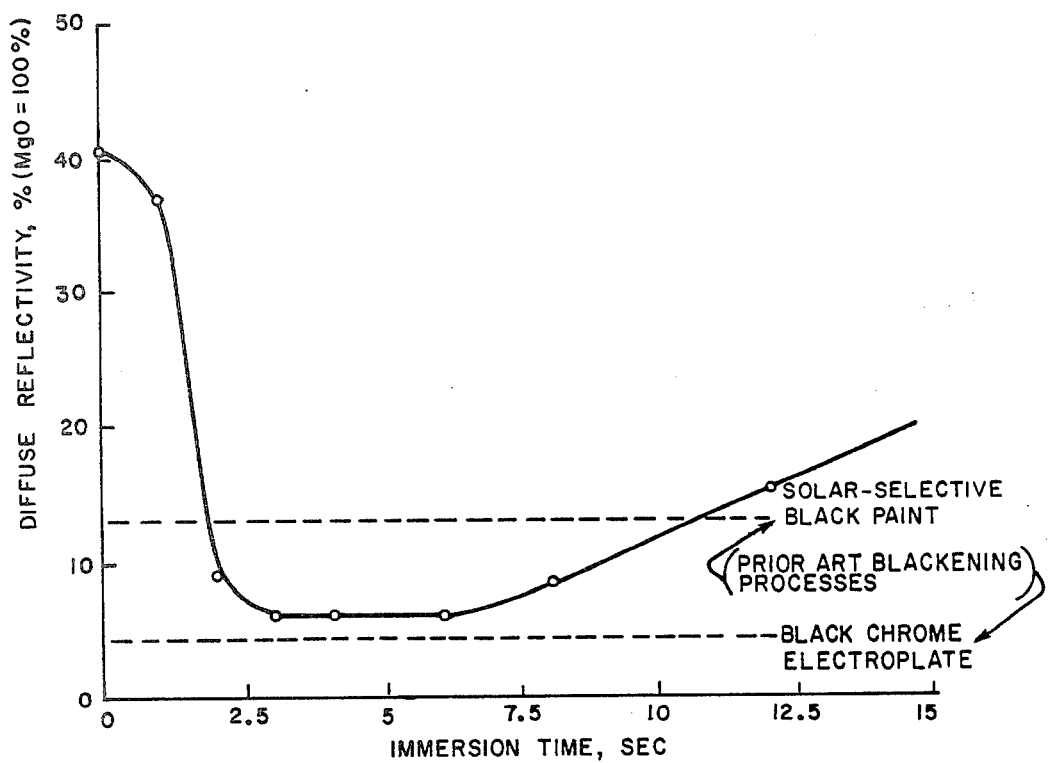
FIG. 4a illustrates the effect of blackening treatment immersion time for a batch operation on diffuse reflectivity of aluminum-zinc alloy coated sheet or strip subjected to the method of this invention, where the sole variable is the chemical blackening step.

FIG. 4a illustrates the effect of immersion time on diffuse reflectivity of an aluminum-zinc alloy coated steel strip chemically blackened in a static Ni-, Sb- bath, such as described above. Optimum immersion times for the particular solution concentration and temperature used range between about 2.5 to 8 seconds. Such times are ideally suited for continuous operations. Good results, however, can be obtained over a much broader range of immersion times by varying solution concentration and temperature. Thus, while variations in such concentration and temperature are permissible within limits, it is important that the product of "immersion time" and "solution concentration" (sec. X vol. %/100) fall within the range of about 1 to 20. However, within such range there are preferred ranges depending upon the solution temperature. Generally, such product can be decreased with increasing solution temperature. For example, at 190° F., the preferred range for such product is about 1 to 4; at 130° F., the preferred range for such product is about 2 to 7; and, at 73° F., the preferred range for such product is about 7 to 20. These preferred ranges are particularly suitable for relatively high speed continuous strip processing. For example, it was discovered that the blackening bath is much more reactive in a high speed continuous strip processing line. This increased reactivity is caused by agitation of the bath resulting from the rapid movement of the strip through the bath. Compared to a static laboratory or batch solution, the reactivity of the agitated bath is from about 1.5 to 2 times greater.

FIG. 4b illustrates the hemispherical spectral reflectance (absorptance=1-reflectance) of untreated and chemically-blackened aluminum-zinc alloy coated sheet over the range of wavelengths in the solar spectrum. Curves A, B and C represent respectively, immersion times of 4, 8 and 12 seconds for the chemically blackened panels processed according to the method of this invention. For the data of FIG. 4b, the solution concentration was 40 v/o, with a solution temperature of 130° F. (54° C.). For the data of FIG. 4b, diffuse reflectivity was measured in accordance with ASTM Standard E-424-71, Method A—Hemispherical Spectral Reflectance.

Figure 4C:
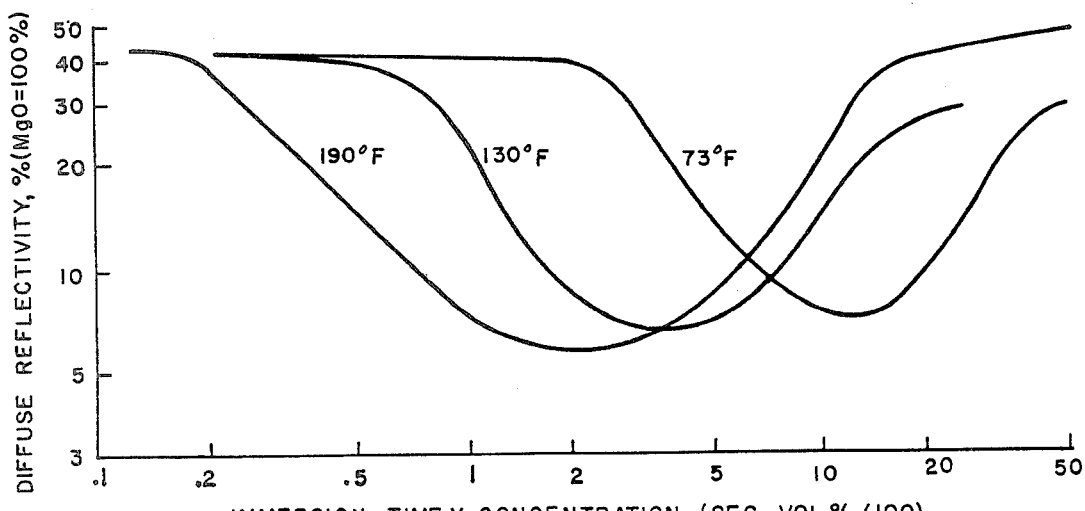
FIG. 4c illustrates the effect of immersion time—solution concentration—solution temperature of the blackening treatment in a batch operation, on diffuse reflectivity of aluminum-zinc alloy coated sheet or strip subjected to the method of this invention, where the only variables are in the chemical blackening step.

As mentioned above and shown in FIG. 4C, immersion time is not the only operative variable in the blackening treatment. FIG. 4C graphically illustrates the effect of immersion time—solution concentration—solution temperature on the diffuse reflectivity of aluminum-zinc alloy coated steel strip. FIG. 4C shows that shorter immersion times at a fixed solution or bath concentration may be practiced with this invention by increasing the temperature of the blackening bath. However, at very high temperatures evaporation of the bath may become a problem. Accordingly, the optimum temperature of the blackening bath is between 130° and 190° F. (54° and 88° C.).

According to this invention aluminum-zinc alloy coated ferrous products, such as commercial hot-dip galvanized strip and GALVALUME sheet, when chemically treated by alkaline solution followed by treatment in a solution containing Ni and Sb will possess a uniformly black, light-absorbing surface layer having a thickness of at least 80 nm, preferably in the neighborhood of 100-400 nm, more preferably about 200-300 nm. The surface layer thus formed has a composition of approximately 30 a/o oxygen, 28 a/o zinc, 17 a/o nickel, 12 a/o antimony, 3-6 a/o each of carbon, sulfur, nitrogen. The chemically treated, coated sheet has a surface layer having a very high absorptance (~95-98%) over the solar radiation spectrum (FIG. 2). A uniform, light-absorbing surface layer according to this invention means uniform as to color. That is, the surface is uniformly black with no off-black or tinted areas. From FIG. 4a, for example, it will be seen that with immersion times of less than about two seconds, the diffuse reflectivity is quite high indicating an under-reacted surface. Such a surface would appear color-tinted to the observer. At the other end of the curve the diffuse reflectivity begins to increase after about seven seconds. At immersion times above about twelve seconds, the surface will be over-reacted. To the observer the surface would appear gray rather than black.

EXAMPLES

Following the process sequence illustrated schematically in FIG. 1, a coil of GALVALUME sheet, having a thickness of 0.019 inch, and moving at a speed of 35 ft./minute, was processed on a pilot line under the following conditions:

A. Alkaline Pretreatment
1. bath of sodium hydroxide (30 gm/l)
2. 8 seconds immersion time
3. bath temperature, 170° F.

B. Blackening Treatment
1 bath of RT-Z40 (35 vol. %)
2. 8 seconds immersion time
3. bath temperature, 130° F.
4. immersion time X concentration
   (sec. X vol. %/100)=2.80

C. Water Rinses
1. Temperature, 150° F.

Again following the schematic sequence illustrated in FIG. 1, an oil coated, commercial coil of Galvalume sheet, having a thickness of 0.019 inch, moving at a speed of 200 ft/minute, was processed under mill trial conditions, as follows:

A. Alkaline Pretreatment
1. bath of sodium hydroxide (60gm/l)
2. 23 seconds immersion time
3 bath temperature, 190° F.

B. Blackening Treatment
1. bath of RT-Z40 (7 vol. %)
2. 45 seconds immersion time
3. bath temperature, 130° F.
4. immersion time X concentration
   (sec. X vol. %/100)=3.15

C. Water Rinses
1. Temperature, 150° F.

In the discussion of the process of this invention, the significance and/or effect of the several steps and the variable parameters threof have been reviewed. From this discussion and the preceding examples a worker skilled in the art should be able to readily establish the proper parameters for practicing the invention. Accordingly, within the framework of these specifications modifications are contemplated. For example, under the coiling and handling conditions of a high speed, continuous processing line, and during subsequent mill and manufacturer handling, scratching of the blackened surface can occur through abrasion of one lap to an adjacent lap of the coil. To minimize this lap-to-lap abrasion during coil handling, the processing sequence may be modified to (1) include the application to the blackened sheet of a mar resistant top coat, i.e. a dilute solution of a water-diluted resin, and (2) paper interleafing during coiling or sheet take-up.

We claim:

1. A method of treating a metallic coated product to form a thin, uniformly black, light-absorptive surface layer thereon, said product comprising a core having a coating comprising, by weight, 25 to 70% aluminum, at least 0.5% silicon based on the aluminum content, balance essentially zinc, characterized by the steps of
    (1) treating said product in an aqueous alkaline solution for a time (X), where the aqueous solution has a concentration (Y), and the product (XY) is in the range of 1 to 20, where:
    (X)=time in seconds
    (Y)=concentration in vol. %/100,
    to form on said product a zinc-rich surface,
    (2) rinsing the alkaline solution from said product, and
    (3) treating said zinc-rich surfaced product in the alkaline pretreated and rinsed condition for at least 2 seconds in an acidic aqueous solution of a nickel-antimony blackening bath in which the zinc-rich surface reacts with said bath to form a thin, uniformly black, light absorptive layer having a thickness of at least 80 nm on the surface of said metallic coated product, and an average absorptance of at least 95% over the solar radiation spectrum.

2. The method according to claim 1 characterized by said alkaline solution being formed of a member selected from the group consisting of sodium carbonate and sodium hydroxide.

3. The method according to claim 2 characterized by said member being present in said solution in a concentration of at least 3.75 g/liter.

4. The method according to claim 3, characterized by said member being present in the solution in a concentration of at least 7.5 g/liter.

5. The method according to claim 1, characterized by said nickel-antimony blackening bath containing nickelous chloride and antimony potassium tartrate as the primary active constituents.

6. The method according to claim 5, characterized by said blackening bath further containing sodium thiocyanate, ammonium flouride and sulfuric acid as secondary constituents.

* * * * *